United States Patent Office 2,701,261
Patented Feb. 1, 1955

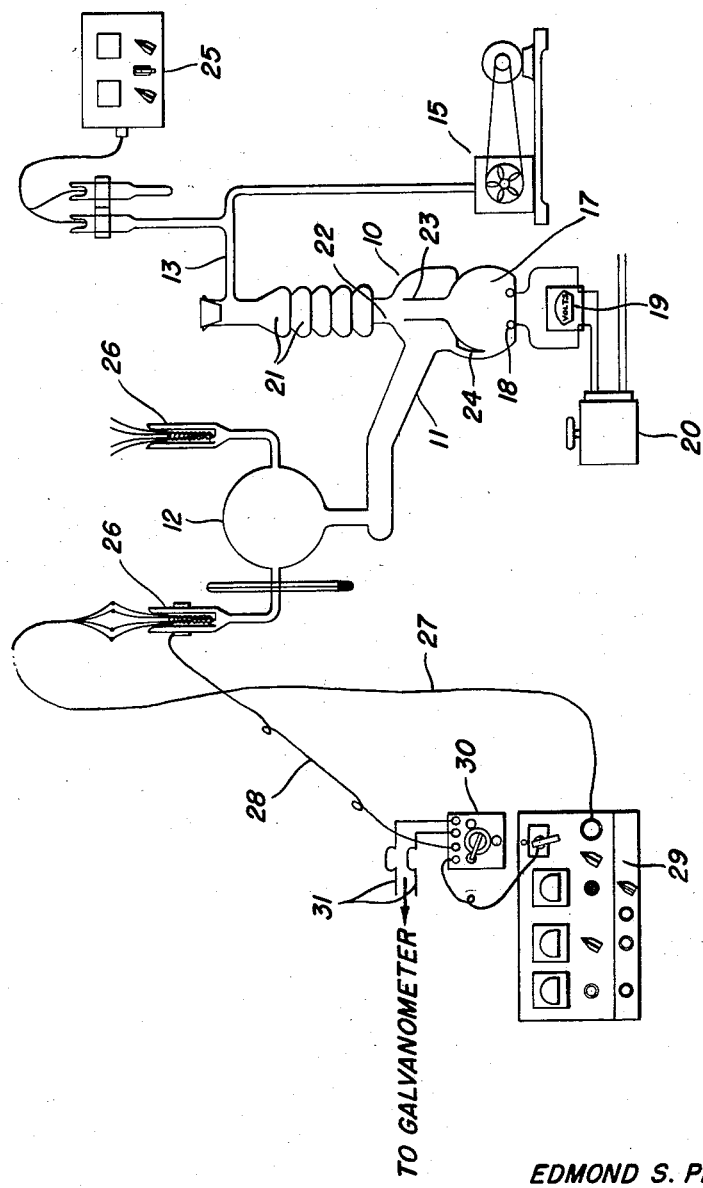

2,701,261

METHODS OF PURIFYING ORGANIC ESTER VACUUM PUMP FLUID COMPOSITIONS

Edmond S. Perry and Dean S. Cox, Rochester, N. Y., assignors to Eastman Kodak Company, Rochester, N. Y., a corporation of New Jersey Application December 8, 1950, Serial No. 199,838

15 Claims. (Cl. 260—475)

This invention relates to pump fluid compositions having enhanced evacuating power as diffusion pump fluids and to methods of preparing such compositions.

The commercial practice of high-vacuum technology in such processes as vacuum coating with metals, high-vacuum distillation of thermally labile materials, evacuation of electronic tubes, vacuum dehydration and the like is dependent upon suitable means for producing high vacuums in the range from 1 mm. Hg down to a few tenths of a micron Hg pressure. Such evacuating is usually effected by the use, in combination with a mechanical vacuum pump, of a diffusion vacuum pump, such as described in Hickman U. S. Patent 2,080,421; Embree U. S. Patent 2,150,676; or Johnson U. S. Patent 2,395,552, employing an organic ester pump fluid as described in Hickman U. S. Patent 1,857,508; Baxter U. S. Patent 2,147,479; or Hickman U. S. Patent 2,147,488.

Prior to this invention, such organic ester pump fluids were ordinarily prepared by distilling a suitable commercially available organic ester in a high vacuum still, collecting the distillate in fractions, testing the distillate fractions for evacuating power as a diffusion pump fluid, and retaining only such portions of distillate as produced a desired degree of vacuum when employed in a diffusion pump. In the usual case, only the final 50–55% of distillate proved to be suitable as a diffusion pump fluid and the remainder had to be discarded. In some cases, substantially none of the distillate was suitable as a pump fluid. The reason for the inability of part or all of the distillate to perform satisfactorily was not and is not now apparent since, other than in evacuating power, the original ester composition and the distillate, whether good or bad, usually had essentially the same physical and chemical characteristics insofar as could be determined.

It is accordingly an object of this invention to provide improved pump fluid compositions having enhanced evacuating power as diffusion pump fluids.

Another object of the invention is to provide an improved method of preparing highly effective pump fluid compositions in increased yield.

Another object of the invention is to provide a method of treating organic ester compositions having undesirably low evacuating power as diffusion pump fluids to recover a major proportion of the ester composition as a pump fluid composition of enhanced evacuating power.

Another object of the invention is to provide highly effective pump fluid compositions from hitherto discarded waste material.

Another object of the invention is to provide a method of preparing effective pump fluid compositions more economically than by prior art processes.

Another object of the invention is to provide a method of reclaiming waste portions of distillate obtained by high vacuum distillation of organic ester compositions of the pump fluid type.

Another object of the invention is to provide organic ester pump fluid compositions having greater evacuating power as diffusion pump fluids than organic ester compositions of essentially the same detectable chemical and physical characteristics as prepared by prior art processes.

Another object of the invention is to further the progress of high vacuum technology by providing improved pump fluid compositions at reduced cost.

Other objects will be apparent from the description and claims which follow:

These and other objects are attained by means of this invention as described more fully hereinafter with particular reference to preferred embodiments thereof and as defined in the appended claims.

In the early diffusion pump models, mercury was employed as the pumping fluid. Subsequently it was found that certain high-boiling organic esters were superior to mercury as actuating fluids because of their non-toxicity and their lower vapor pressure. It is with organic ester pump fluid compositions of enhanced evacuating power and characterized by being liquid at 100° C. and having a vapor pressure not greater than 100 microns Hg at 200° C., and with the preparation of such compositions, that this invention is concerned.

Insofar as is known, there is no empirical method of determining whether a particular organic ester composition will perform satisfactorily, that is, whether its evacuating power is sufficient to produce a predetermined vacuum when the composition is employed as a diffusion vacuum pump fluid. Certain minimum physical characteristics are necessary but two organic ester compositions having the minimum phsyical characteristics as regards liquidity and vapor pressure and having essentially the same measurable physical and chemical characteristics will not necessarily have the same evacuating power. The evacuating power of a particular pump fluid is determined by actual performance data collected under controlled operating conditions in a diffusion pump.

In order to fully understand the significance of the present invention, it is desirable to describe the invention with reference to evacuating power evaluations as carried out in the apparatus illustrated by the drawings. The sole figure of the drawings is a view in elevation of apparatus employed in evaluating the evacuating power of pump fluid compositions embodying this invention.

With reference to the drawing, the evaluating apparatus comprises a single-stage glass diffusion pump 10 having its low pressure inlet 11 connected to an evacuable chamber 12 and having its forepressure outlet 13 connected to a mechanical vacuum pump 15. Pump 10 includes the usual boiler 17 provided with a heater element 18 connected to a source of electrical current (not shown) through a voltmeter 19 and Variac 20. Boiler 17 communicates with the pumping chamber 22 through jet nozzle 23, and through pump fluid return conduit 24, the pumping chamber being provided with alembics 21, 21. A Pirani vacuum gauge 25 is connected to the forepressure outlet 13 of pump 10. The evacuable chamber 12 is provided with an ionization gauge assembly comprising a pair of ion tubes 26, 26 communicating with chamber 12 and leads 27 and 28 connecting one such tube to ionization gauge 29 and galvanometer shunt 30, the entire ionization gauge assembly being connected through leads 31, 31 to a galvanometer and power source (not shown).

A pump fluid composition is evaluated in the apparatus illustrated in the drawing by the following procedure. The pump fluid composition is charged into boiler 17 and the system is closed. With the temperature about the apparatus maintained at 25° C., the mechanical vacuum pump 15 is actuated. When pump 15 has evacuated the system to a forepressure of 25 microns Hg or lower as measured by Pirani gauge 25, heater element 18 is energized and a stream of air is directed on the alembics 21, 21 of pumping chamber 22. Pump fluid vapors generated in the boiler 17 are ejected through nozzle 23 into pumping chamber 22 and thereby exert their pumping action to evacuate chamber 12. The vapors are condensed on the walls of the pumping chamber 22 and flow back into boiler 17 for revaporization. The heater input is adjusted until optimum pumping conditions are attained, the pressure in chamber 12 being checked by means of the ionization gauge assembly. Leads 27 and 28 are connected to first one ion tube 26 and then the other to check the accuracy of the measurements. The lowest stable pressure obtained in chamber 12 within four hours at a room temperature of 25° C. is the measure of the ultimate vacuum of the pump fluid or, more precisely, its evacuating power.

Various organic ester compositions have been employed as pump fluids prior to this invention. Such pump fluids usually consisted of a portion of the distillate obtained by high vacuum distillation of a commercial organic ester and the amount of useable ester varied greatly from batch to batch. The pump fluids were tested as progressive fractions of distillate and the best fractions employed as standards for the particular ester. Thus it was the practice to discard all fractions which did not exhibit sufficient evacuating power to attain the predetermined degree of vacuum. For example, it was determined that the 2-ethyl hexyl sebacate diester and the 2-ethyl hexyl phthalate diester respectively would give an ultimate vacuum of $5 \times 10^{-6}$ mm. Hg with the best fractions of distillate and this value was selected as the minimum measure of satisfactory evacuating power for such esters. Other typical standards, expressed as mm. Hg are $6 \times 10^{-5}$ for diamyl phthalate; $2 \times 10^{-5}$ for diamyl sebacate; and $5 \times 10^{-5}$ for butyl sebacate. Some batches of such esters would yield a distillate of as much as 55% of ester meeting such standard, others would yield 0–10% of useable pump fluid. The remainder of the distillate had to be discarded as unuseable, since even fractionation in a 7-plate fractionating column failed to increase the yield of useable pump fluid.

In accordance with this invention, however, the yield of useable pump fluid has been raised to 85–95% and the pump fluid compositions embodying the invention have enhanced evacuating power over the best fractions obtained by vacuum distillation. In accordance with this invention, superior pump fluid compositions are obtained in greatly increased yield by subjecting an organic ester of the pump fluid type to solvent partition in a mixture of a non-polar solvent and a polar solvent which is substantially immiscible with the non-polar solvent, allowing the mixture to separate into a non-polar solvent phase and a polar solvent phase, separating the non-polar solvent phase, and evaporating away the solvent from the non-polar solvent phase and thereby recovering a major proportion, usually 85–95%, of the organic ester as a pump fluid composition which, in all fractions, is capable of producing the desired ultimate vacuum or surpassing the standard set up from the best distilled fractions.

A pump fluid composition embodying this invention and having enhanced evacuating power as diffusion pump fluid thus consists essentially of an organic ester and is characterized by being liquid at 100° C. and having a vapor pressure below 100 microns Hg at 200° C. and such pump fluid composition comprises the non-polar solvent extract, freed of solvent, obtained by solvent partition with a non-polar solvent and a polar solvent substantially immiscible with the polar solvent, of an organic ester composition having essentially the same detectable physical and chemical characteristics as the pump fluid composition but having lower evacuating power as a diffusion pump fluid.

The pump fluid compositions embodying this invention can be obtained by solvent partition, in accordance with this invention, of the hitherto unuseable fractions of distillate obtained by vacuum distillation of a pump fluid-type organic ester in which case more than 90% of the hitherto discarded fraction is recovered as highly effective pump fluid. Preferably the pump fluid compositions embodying the invention are obtained in accordance with this invention by solvent partition of the commercially available pump fluid type organic esters which would ordinarily be vacuum distilled according to prior practices.

Such organic esters are those materials which are liquid at 100° C. and which have a vapor pressure not greater than 100 microns Hg at 200° C. Such esters include esters of fatty acids such as stearic acid, palmitic acid and the like but are preferably esters of dibasic acids such as phthalic acid, sebacic acid, glutaric acid, adipic acid, pimelic acid, suberic acid, azelaic acid and the like having such physical characteristics. Esters which are eminently suitable are the organic acid esters of alcohols having at least 4 carbon atoms and desirably 6 to 9 carbon atoms, with the dibasic acid alkyl diesters having from 12 to 42 carbon atoms being preferred. Of such esters, either the normal or isomeric forms can be employed, as for example the di-n-octyl phthalates or sebacates and the di-iso-octyl phthalates or sebacates. Typical organic ester pump fluids include butyl stearate, di-n-hexyl phthalate, di-n-heptyl phthalate, di-n-octyl phthalate, di-(2-ethyl hexyl) phthalate, di-n-nonyl phthalate, di-(β-phenyl ethyl) phthalate, diamyl sebacate, dibutyl sebacate, dihexyl sebacate, di(2-ethyl hexyl) sebacate, dicapryl succinate, dilauryl oxalate, dicapryl adipate, di-(β-phenyl ethyl) adipate, di-(γ-phenyl propyl) adipate, diisoamyl phthalate, di-n-butyl terephthalate, di-n-amyl phthalate, butyl benzyl phthalate, di-iso-hexyl phthalate, di-n-octyl sebacate and the like.

The pump fluid compositions embodying this invention, like the vacuum-distilled esters heretofore employed, have essentially the same detectable physical and chemical properties as the original ester including such characteristics as refractive index, specific gravity, acid value, iodine value and the like, but differ in evacuating power with the solvent-partitioned compositions of this invention being superior to the substandard organic esters and the vacuum distilled pump fluids obtained therefrom.

In the process of solvent partition in accordance with this invention, the substandard organic ester being treated is thoroughly mixed with a non-polar solvent and a polar solvent in a suitable mixer or in a countercurrent extraction column or other solvent extraction apparatus. The mixture preferably employed comprises at least 2 cc. of polar solvent and 4 cc. of non-polar solvent to each gram of material being treated. After mixing, the mixture separated into a non-polar solvent phase and a polar solvent phase. The non-polar solvent phase is drawn off and the solvent removed therefrom by evaporation, as for example by heating on a steam bath under slightly reduced pressure. Residual traces of solvent are removed by heating the extract in a pot still under vacuum, usually at from 130°–195° C. for about 1 hour until the pressure drops to the point where distillation of the ester is about to begin.

If desired, the yield of effective pump fluid can be further increased by recycling the polar solvent extract through a subsequent solvent partition batch whereby from 95–98% of useable pump fluid is recovered.

In effecting the solvent partition in accordance with this invention any of the well-known non-polar solvents can be employed with the paraffinic hydrocarbons and particularly the so-called petroleum ethers and similar low boiling petroleum fractions being desirably employed, petroleum fractions having boiling points of 90° to 260° F. being most suitable. Such preferred petroleum fractions include normal hexane, pentane, heptane, and octane fractions as well as mixtures of these or other petroleum fractions. In like manner, any of the well-known polar solvents can be employed such as the aliphatic alcohols, nitro-alkanes, ketonitriles and the like as typified by such materials as methanol, ethanol, isopropanol, acetonitrile, nitromethane and the like. In the case of water-miscible polar solvents such as the alcohols, the polar solvent can contain as much as 5%, 10% or more water, the water serving to increase the yield of pump fluid from the non-polar solvent in a single extraction.

The invention is best illustrated by reference to certain preferred methods and compositions as described in the following examples.

*Example 1*

A commercial grade of di-2-ethyl hexyl sebacate was subjected to distillation in a high vacuum fractionating tower having a separating power of 7 plates. The standard of evacuating power for di-2-ethyl hexyl sebacate when employed as pump fluid in a single stage diffusion pump as shown in the drawing is $5.0 \times 10^{-6}$ mm. Hg. The first 45.4% of distillate failed to produce the predetermined vacuum of $5.0 \times 10^{-6}$ mm. Hg when tested as described in connection with the drawing. Thus, the fraction, 4.8 to 10.5% produced an ultimate vacuum of only $2.9 \times 10^{-5}$ mm. Hg in 2 hours or nearly 6 times the acceptable pressure. The fraction, 35.3–45.4%, had improved but gave an ultimate vacuum of $7.6 \times 10^{-6}$ mm. Hg in 2 hours or nearly 50% higher than the acceptable evacuating power. Only the last 55% of distillate met the standard with an ultimate vacuum of $4.3 \times 10^{-6}$ mm. Hg in 2 hours. The effect of redistillation was then checked by discarding the first 15.3% of distillate from the previous fractionation and again fractionally distilling the remaining 84.7% of distillate. In this redistillation, only the fraction after the first 43.8% had been discarded, was useable as pump fluid giving an ultimate vacuum of $4.4 \times 10^{-6}$ mm. Hg in 2 hours.

The fraction, 9.4 to 43.8%, of this discarded second distillate was then subjected to solvent partition in accordance with this invention by mixing the fraction with 4 cc. of a petroleum fraction boiling in the range of 95°–138° F. and 4 cc. of acetonitrile for each gram of the fraction. The mixture was shaken in a separatory funnel, allowed to stand one hour, the petroleum fraction phase drawn off, and the bulk of the petroleum fraction was removed on a steam bath under slightly reduced pressure produced by a water aspirator. The extract was then rid of residual petroleum fraction by heating it in a pot vacuum still until the temperature reached 195° C. and the vacuum dropped to 15 microns Hg.

The pump fluid composition obtained thereby was tested for evacuating power and produced an ultimate vacuum of $2.2 \times 10^{-6}$ mm. Hg in 1¾ hours or an increase in evacuating power of 100% over the useable fraction obtained by two successive vacuum distillations. The yield of highly effective pump oil was about 90% of the material treated.

*Example 2*

The process embodying the invention is equally as applicable to undistilled commercial grade organic esters as to unuseable distillate fraction. Thus for example, a second batch of the same lot of commercial grade di-2-ethyl hexyl sebacate as employed in Example 1 was treated in accordance with this invention without prior distillation. Solvent partition was effected as in Example 1 employing 4 cc. of a petroleum fraction boiling in the range of 95°–138° F. and 4 cc. of acetonitrile for each gram of organic ester. The yield of pump fluid from the petroleum fraction phase was above 90% and the pump fluid, after being freed of solvent, produced an ultimate vacuum of $2.2 \times 10^{-6}$ in 1¼ hours in the test apparatus.

*Example 3*

A further batch of undistilled commercial grade di-2-ethyl hexyl sebacate from the same lot as employed in Examples 1 and 2 was subjected to solvent partition as described employing methanol containing 5% water as the polar solvent and a petroleum fraction boiling in the range of 95°–138° F. as the non-polar solvent. The yield of pump fluid was 88% of the original charge and the pump fluid produced an ultimate vacuum of $3.0 \times 10^{-6}$ mm. Hg in 45 minutes.

*Example 4*

A batch of di-2-ethyl hexyl phthalate which had been stripped in a high vacuum centrifugal still was tested for evacuating power and produced an ultimate vacuum of $8.0 \times 10^{-6}$ mm. Hg in 3.5 hours. This batch was then treated by solvent partition in accordance with this invention using a mixture of acetonitrile and a petroleum fraction boiling in the range of 95°–138° F. The petroleum fraction extract, after removal of the solvent, produced an ultimate vacuum of $3.0 \times 10^{-6}$ in one hour.

*Example 5*

A glass lined kettle was charged with a normal hexane petroleum fraction boiling in the range of 146°–157° F. To the kettle was added a batch of di-2-ethyl hexyl sebacate in the ratio of 1 gram of oil to 4 cc. of petroleum fraction. The mixture was thoroughly agitated; and while being agitated, the mixture was diluted with 95% methanol (aqueous) added over a period of 15 minutes in a total amount equal to the volume of petroleum fraction. The mixture was allowed to separate, and the methanol phase withdrawn from the kettle. The petroleum fraction phase remaining in the kettle was subjected to reduced pressure effective to evaporate away the bulk of the petroleum fraction from the pump fluid extract, the extract was heated with steam for 60 minutes until the temperature reached 130° C. and the pressure 27" of mercury. The pump fluid extract was then transferred to a pot still and residual solvent removed by heating at 195°–200° C. under a high vacuum of about 20 microns Hg. The pump fluid was recovered in 88% yield and produced an ultimate vacuum of $2.9 \times 10^{-6}$ mm. Hg in 2 hours. The methanol phase was reprocessed as described and the extracts combined to give pump fluid in 98% yield producing an ultimate vacuum of $3.8 \times 10^{-6}$ mm. Hg in 2.5 hours.

*Example 6*

A batch of di-2-ethyl hexyl phthalate was treated as described in Example 5 employing 90% methanol (aqueous) as the polar solvent. The pump fluid was recovered in 95% yield from the petroleum fraction phase and produced an ultimate vacuum of $3.4 \times 10^{-6}$ mm. Hg in 2 hours.

*Example 7*

A batch of di-2-ethyl hexyl sebacate (commercial grade) was extracted with a mixture of 95% methanol (aqueous) and a petroleum fraction boiling in the range of 146°–157° F. with the solvents being used in the ratio of 4 cc. of petroleum fraction and 2 cc. of 95% methanol to each gram of ester. The pump fluid obtained thereby was recovered in 88% yield and produced an ultimate vacuum of $2.9 \times 10^{-6}$ mm. Hg in 2 hours.

*Example 8*

In an extraction such as described in Example 5, a batch of undistilled di-2-ethyl hexyl phthalate was treated with a mixture of 4 cc. of normal hexane and 2 cc. of 90% methanol (aqueous) for each gram of ester. The pump fluid composition was recovered in 95% yield and produced an ultimate vacuum of $3.0 \times 10^{-6}$ mm. Hg in 2 hours.

Similar results are obtained using other non-polar solvents such as normal heptane fractions, pentane-hexane fractions, hexane-heptane fractions, octane fractions and the like as well as with other polar solvents such as nitromethane, chloroform, ethanol and the like, and other organic esters suitable as pump fluids such as other phthalates, sebacates and the like.

The invention thus provides a simple method of obtaining high yields of organic ester pump fluid compositions of enhanced evacuating power from undistilled commercially available organic esters as well as hitherto unuseable distillate fractions.

While the invention has been described in considerable detail with reference to certain preferred embodiments, it will be understood that variations and modifications can be effected within the spirit and scope of the invention as described hereinabove and as defined in the appended claims.

We claim:

1. The method of preparing an organic ester diffusion vacuum pump fluid composition of enhanced evacuating power, which method comprises subjecting a dibasic acid alkyl diester pump fluid which is liquid at 100° C., which has a vapor pressure not greater than 100 microns Hg at 200° C. and which has relatively lower evacuating power to solvent partition in a mixture of a non-polar solvent comprising a parafinic hydrocarbon and a polar solvent substantially immiscible with said non-polar solvent, separating the polar solvent phase from the non-polar solvent phase, and freeing said non-polar solvent phase of solvent and thereby recovering a major proportion of said diester composition as a pump fluid composition having enhanced evacuating power.

2. The method of preparing a pump fluid composition of enhanced evacuating power which comprises mixing together a dialkyl sebacate pump fluid which is liquid at 100° C. and which has a vapor pressure not greater than 100 microns Hg at 200° C., a non-polar solvent comprising a parafinic hydrocarbon, and a polar solvent which is substantially immiscible with said non-polar solvent, separating out the non-polar solvent phase, and evaporating the solvent from said non-polar solvent phase to give a dialkyl sebacate pump fluid composition of enhanced evacuating power as a diffusion pump fluid.

3. The method of preparing a pump fluid composition of enhanced evacuating power which comprises mixing together a dialkyl phthalate pump fluid which is liquid at 100° C. and which has a vapor pressure not greater than 100 microns Hg at 200° C., a non-polar solvent comprising a paraffinic hydrocarbon, and a polar solvent which is substantially immiscible with said non-polar solvent, separating out the non-polar solvent phase, and evaporating the solvent from said non-polar solvent phase to give a dialkyl phthalate pump fluid composition of enhanced evacuating power as a diffusion pump fluid.

4. The method of preparing an organic ester pump fluid composition of enhanced evacuating power as a diffusion pump fluid, which method comprises subjecting a dibasic acid alkyl diester pump fluid which is liquid at 100° C., which has a vapor pressure not greater than 100 microns Hg at 200° C. and which has relatively low evacuating power to distillation under vacuum and thereby separating a fraction of such diester still having less than a desired evacuating power, and thereafter subjecting said fraction to solvent partition in a mixture of a non-polar solvent comprising a paraffinic hydrocarbon and a polar solvent substantially immiscible with said non-polar solvent, separating the polar solvent phase from the non-polar solvent phase and freeing said non-polar solvent phase of solvent and thereby recovering a major proportion of said fraction as a pump fluid composition having enhanced evacuating power.

5. The method of preparing an organic ester pump fluid composition capable of producing a predetermined minimum pressure when employed in a diffusion vacuum pump, which method comprises subjecting an organic ester of relatively lower evacuating power and characterized by being liquid at 100° C., having a vapor pressure not greater than 100 microns Hg at 200° C., and being selected from the group consisting of dibasic acid alkyl diesters containing from 12 to 26 carbon atoms and esters of a fatty acid having 16 to 18 carbon atoms and an alcohol having 4 to 9 carbon atoms, to solvent partition in a mixture of a non-polar solvent comprising a paraffinic hydrocarbon and a polar solvent substantially immiscible with said non-polar solvent, separating the polar solvent phase from the non-polar solvent phase, and evaporating away the non-polar solvent from said non-polar solvent phase.

6. The method of preparing an organic ester pump fluid composition capable of producing a predetermined degree of vacuum as a diffusion pump fluid, which method comprises mixing together an organic ester of relatively lower evacuating power and characterized by being liquid at 100° C., having a vapor pressure not greater than 100 microns Hg at 200° C., and being selected from the group consisting of dibasic acid alkyl diesters containing from 12 to 26 carbon atoms and esters of a fatty acid of 16 to 18 carbon atoms with an alcohol of 4 to 9 carbon atoms, a non-polar solvent comprising a paraffinic hydrocarbon and a polar solvent selected from the group consisting of lower alkyl alcohols, nitroalkanes and ketonitriles and being substantially immiscible with said non-polar solvent, thereafter separating the non-polar phase from the resulting mixture, and removing substantially all of the solvent from said non-polar solvent phase by evaporation.

7. The method of preparing an organic ester pump fluid composition of enhanced evacuating power which comprises mixing together an organic ester of relatively lower evacuating power and characterized by being liquid at 100° C., having a vapor pressure not greater than 100 microns Hg at 200° C. and being selected from the group consisting of dibasic acid alkyl diesters containing from 12 to 26 carbon atoms and esters of a fatty acid of 16 to 18 carbon atoms with an alcohol of 4 to 9 carbon atoms, a non-polar solvent comprising a paraffinic hydrocarbon and a polar solvent comprising a water miscible lower alkyl alcohol which is substantially immiscible with said non-polar solvent, separating the non-polar solvent phase from the resulting mixture and recovering an essentially solvent-free pump fluid composition of enhanced evacuating power by evaporating the solvent from said non-polar solvent phase.

8. The method of preparing an organic ester pump fluid composition of enhanced evacuating power which comprises mixing together an organic ester of undesirably low evacuating power and characterized by being liquid at 100° C. having a vapor pressure not greater than 100 microns Hg at 200° C., and being selected from the group consisting of dibasic acid alkyl diesters containing from 12 to 26 carbon atoms and esters of a fatty acid containing 16 to 18 carbon atoms with an alcohol containing 4 to 9 carbon atoms, acetonitrile, and a paraffinic hydrocarbon substantially immiscible with said acetonitrile, thereafter separating the paraffinic hydrocarbon phase from the resulting mixture, and recovering an essentially solvent-free pump fluid composition of enhanced evacuating power by evacuating the solvent from said paraffinic hydrocarbon phase.

9. The method of preparing an organic ester pump fluid composition of enhanced evacuating power which comprises mixing together an organic ester of relatively lower evacuating power and characterized by being liquid at 100° C., having a vapor pressure not greater than 100 microns Hg at 200° C., and being selected from the group consisting of dibasic acid alkyl diesters containing from 12 to 26 carbon atoms and esters of a fatty acid containing 16 to 18 carbon atoms with an alcohol containing 4 to 9 carbon atoms, methanol containing not more than about 10% water and a paraffinic hydrocarbon substantially immiscible with said methanol, thereafter separating the paraffinic hydrocarbon phase from the resulting mixture, and recovering an essentially solvent-free pump fluid composition of enhanced evacuating power by evaporating the solvent from said paraffinic hydrocarbon phase.

10. The method of preparing a pump fluid composition of enhanced evacuating power which comprises mixing together the distillate of an organic ester of relatively lower evacuating power and characterized by being liquid at 100° C., having a vapor pressure not greater than 100 microns Hg at 200° C., and being selected from the group consisting of dibasic acid alkyl diesters containing from 12 to 26 carbon atoms and esters of a fatty acid containing 16 to 18 carbon atoms and an alcohol containing 4 to 9 carbon atoms, a petroleum fraction boiling in the range of 90°–260° F., and a polar solvent substantially immiscible with said petroleum fraction, separating the petroleum fraction phase from the resulting mixture, and recovering from said petroleum fraction phase a pump fluid composition of enhanced evacuating power by evaporating the solvent from said petroleum fraction phase.

11. The method of preparing a highly effective pump fluid composition in high yield which comprises mixing together a composition consisting essentially of a dibasic acid alkyl diester containing from 12 to 26 carbon atoms, a petroleum fraction boiling in the range of 90°–260° F. and a polar solvent selected from the group consisting of lower alkyl alcohols, nitroalkanes and ketonitriles and being substantially immiscible with said petroleum fraction, separating the petroleum fraction phase from the resulting mixture, and recovering from said petroleum fraction phase an essentially solvent-free pump fluid composition by evaporating the solvent from said fraction phase.

12. A method as defined by claim 1 in which the dibasic acid alkyl diester is a di-octyl sebacate.

13. A method as defined by claim 1 in which the dibasic acid alkyl diester is di-2-ethyl hexyl sebacate.

14. A method as defined by claim 1 in which the dibasic acid alkyl diester is a di-octyl phthalate.

15. A method as defined by claim 1 in which the dibasic acid alkyl diester is di-2-ethyl hexyl phthalate.

References Cited in the file of this patent
UNITED STATES PATENTS

| Number | Name | Date |
|---|---|---|
| 1,857,506 | Hickman | May 10, 1932 |
| 2,080,421 | Hickman | May 18, 1937 |
| 2,147,479 | Baxter | Feb. 14, 1939 |
| 2,147,488 | Hickman | Feb. 14, 1939 |
| 2,150,676 | Embree | Mar. 14, 1939 |
| 2,245,945 | van Dijck | June 17, 1941 |
| 2,335,511 | Havemann et al. | Nov. 30, 1943 |

OTHER REFERENCES

Houben: Die Methoden der Organischen Chemie, dritte Auflage (1925 ed.), pages 567–568.